(12) United States Patent
Quaiyum et al.

(10) Patent No.: US 10,620,078 B2
(45) Date of Patent: Apr. 14, 2020

(54) PERFORMING A DIAGNOSTIC ON A HYDRAULIC SYSTEM WHILE THE VEHICLE IS OPERATING

(71) Applicant: Robert Bosch GmbH, Stuttgart (DE)

(72) Inventors: Labiba Quaiyum, Northville, MI (US); Qingyuan Li, Superior Township, MI (US); Wenguang Zhou, Novi, MI (US); Reimar Fuchs, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 162 days.

(21) Appl. No.: 15/816,350

(22) Filed: Nov. 17, 2017

(65) Prior Publication Data
US 2019/0154537 A1    May 23, 2019

(51) Int. Cl.
| | | |
|---|---|---|
| B60T 8/34 | (2006.01) |
| G01M 3/18 | (2006.01) |
| B60T 8/90 | (2006.01) |
| G01M 17/007 | (2006.01) |
| G01M 3/26 | (2006.01) |
| B60T 17/22 | (2006.01) |
| B60T 13/66 | (2006.01) |
| B60T 8/88 | (2006.01) |
| G01M 17/00 | (2006.01) |
| B60T 13/74 | (2006.01) |
| B60T 13/68 | (2006.01) |

(Continued)

(52) U.S. Cl.
CPC ............. G01M 3/184 (2013.01); B60T 8/885 (2013.01); B60T 8/90 (2013.01); B60T 13/662 (2013.01); B60T 17/22 (2013.01); B60T 17/221 (2013.01); G01M 3/26 (2013.01); G01M 17/00 (2013.01); G01M 17/007 (2013.01); B60T 8/344 (2013.01); B60T 8/4081 (2013.01); B60T 13/686 (2013.01); B60T 13/745 (2013.01); B60T 2270/403 (2013.01); B60T 2270/406 (2013.01); B62D 5/30 (2013.01)

(58) Field of Classification Search
CPC ....................................................... B60T 8/344
See application file for complete search history.

(56) References Cited

U.S. PATENT DOCUMENTS 2,615,304 A * 10/1952 Groves ................... B60T 11/22
                                                        60/589
4,824,185 A *  4/1989 Leiber ..................... B60T 8/175
                                                        303/113.5

(Continued)

FOREIGN PATENT DOCUMENTS

DE    102013111974 A1    4/2015
DE    102016220485 A1    4/2017

(Continued)

Primary Examiner — Lisa M Caputo
Assistant Examiner — Alex T Devito
(74) Attorney, Agent, or Firm — Michael Best & Friedrich, LLP (57) ABSTRACT

A system and method for performing a diagnostic on a hydraulic system in a vehicle while the vehicle is at a standstill. The method includes, by means of an electronic processor, moving a plunger at a constant rate, determining a position of the plunger, receiving a pressure of the hydraulic system from a pressure sensor, comparing the determined position and the measured pressure to a position versus pressure graph, and sending a diagnostic to a diagnostic indicator.

16 Claims, 4 Drawing Sheets

(51) Int. Cl.
*B60T 8/40* (2006.01)
*B62D 5/30* (2006.01)

(56) References Cited

U.S. PATENT DOCUMENTS

| | | |
|---|---|---|
| 6,425,644 B2 | 7/2002 | Kawahata et al. |
| 6,896,338 B2 | 5/2005 | Nakayasu et al. |
| 7,481,500 B2 | 1/2009 | Miyazaki et al. |
| 8,007,056 B2 | 8/2011 | Ohkubo et al. |
| 8,075,067 B2 | 12/2011 | von Albrichsfeld et al. |
| 8,994,159 B2 | 3/2015 | Nakamura et al. |
| 2004/0236496 A1* | 11/2004 | Sobel .................. F02D 35/0007 701/114 |
| 2007/0035179 A1 | 2/2007 | Kling et al. |

FOREIGN PATENT DOCUMENTS

| | | |
|---|---|---|
| DE | 102016224062 A1 | 6/2017 |
| WO | 2012143175 A2 | 10/2012 |

\* cited by examiner

PERFORMING A DIAGNOSTIC ON A HYDRAULIC SYSTEM WHILE THE VEHICLE IS OPERATING

FIELD

Embodiments relate to a system for performing diagnostics on a hydraulic system in a vehicle.

BACKGROUND

Modern vehicles contain one or more hydraulic systems. For example, braking, suspension, power steering, and other systems may include a hydraulic system. The existence of air or leakage of hydraulic fluid in these systems can cause the systems to malfunction.

SUMMARY

Diagnosing the presence of these conditions (that is, the existence of air in the hydraulic system or a leak of hydraulic fluid) can be difficult and the problems may not be diagnosed until malfunctions have occurred. Currently, checking the pressure in a hydraulic system for a vehicle must be done manually by a technician trained to do so. Typically, diagnosis is performed when the vehicle is not running. The pressure in a hydraulic system is usually tested against a pressure-volume curve in order to confirm that the pressure is at the desired level. However, the pressure-volume curve can be difficult to calibrate and is not the most efficient way of checking the pressure.

Therefore, there is a need for a more robust form of pressure detection in a hydraulic system that does not require manual diagnosis when the vehicle is not running. Further, because the vehicle is running, performing the diagnosis should not affect normal function of the vehicle. The diagnosis should still be efficient and provide an alert to the driver or operator of the vehicle that there is a system fault in the hydraulic system being diagnosed.

Embodiments provide, among other things, methods and systems to perform a diagnostic on a hydraulic system in a vehicle.

One embodiment provides a method of performing a diagnostic on a hydraulic system in a vehicle. The method includes generating, with an electronic controller, a signal to move a plunger fluidly coupled to the hydraulic system, measuring, with a pressure sensor, a pressure of the hydraulic system, determining a position of the plunger, comparing, in the electronic controller, the position of the plunger and the pressure to a position versus pressure curve, and sending, from the electronic controller, at least one diagnostic indication to at least one diagnostic indicator.

Another embodiment provides a system for performing a diagnostic on a vehicle. The system includes a plunger fluidly coupled to the hydraulic system, a pressure sensor, at least one diagnostic indicator, and an electronic controller communicatively coupled to the hydraulic system, the plunger, and the pressure sensor. The electronic controller is configured to generate a signal to move the plunger, determine a pressure of the hydraulic system using the pressure sensor, determine the position of the plunger, compare the position of the plunger and the pressure to a position versus pressure curve, and send at least one diagnostic indication to the at least one diagnostic indicator.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
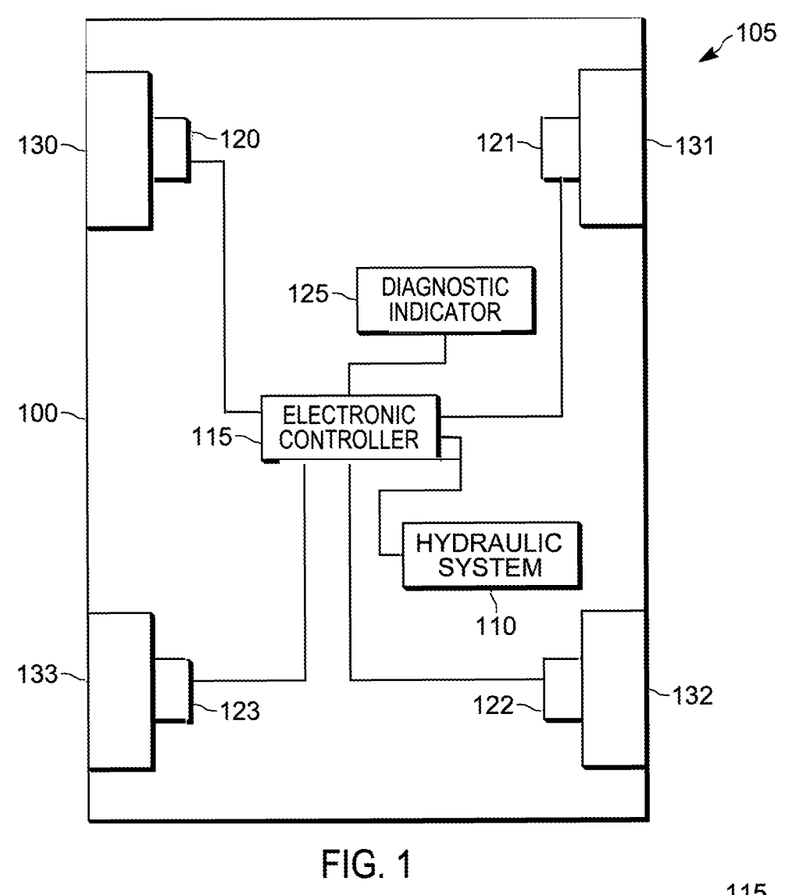
FIG. 1 is a block diagram of a vehicle with a system for performing a diagnostic on a hydraulic system according to one embodiment.

FIG. 1 illustrates an example of a vehicle 100 equipped with a diagnostic system 105 for a hydraulic system 110. The vehicle 100, although illustrated as a four-wheeled vehicle, may encompass various types and designs of vehicles. For example, the vehicle 100 may be an automobile, a motorcycle, a truck, a semi-tractor, and others. In the example illustrated, the diagnostic system 105 includes several hardware components including an electronic controller 115, a wheel speed sensor 120, 121, 122, and 123, and a diagnostic indicator 125.

The hydraulic system 110 may be a system in the vehicle 100 that is used to transfer energy from flow and pressure. In the example, shown, the hydraulic system 110 is a 4-wheel disc braking system that provides force to braking pistons that cause calipers to engage brake discs. Additional details regarding the hydraulic system 110 are provided below with respect to the discussion of FIG. 3.

The electronic controller 115 may be communicatively coupled to the hydraulic system 110 and the wheel speed sensor 120, 121, 122, and 123 via various wired or wireless connections. For example, in some embodiments, the electronic controller 115 is directly coupled via a dedicated wire to each of the above-listed components of the diagnostic system 105. In other embodiments, the electronic controller 115 is communicatively coupled to one or more of the components via a shared communication link such as a vehicle communication bus (for example, a controller area network (CAN) bus) or a wireless vehicle network.

The wheel speed sensor 120, 121, 122, and 123 detects the rotational speed of the respective wheel 130, 131, 132, and 133.

The diagnostic indicator 125 may be a light-emitting diode (LED) light, a speaker, a dashboard indicator, and other indicators. Generally, the diagnostic indicator 125 is any form of indicator that may inform a driver that a certain diagnostic result has been received.

Each of the above-listed components of the diagnostic system 105 may include dedicated processing circuitry including an electronic processor and memory for receiving, processing, and transmitting data associated with the functions of each component. For example, each of the wheel speed sensors 120, 121, 122, and 123 may include an electronic processor that determines parameters or values. In this case, the wheel speed sensor 120, 121, 122, and 123 transmits the parameters or calculated values associated with the parameters to the electronic controller 115. Each of the components of the diagnostic system 105 may communicate with the electronic controller 115 using various communication protocols. The embodiment illustrated in FIG. 1 provides but one example of the components and connections of the diagnostic system 105. However, these components and connections may be constructed in other ways than those illustrated and described herein.

Figure 2:
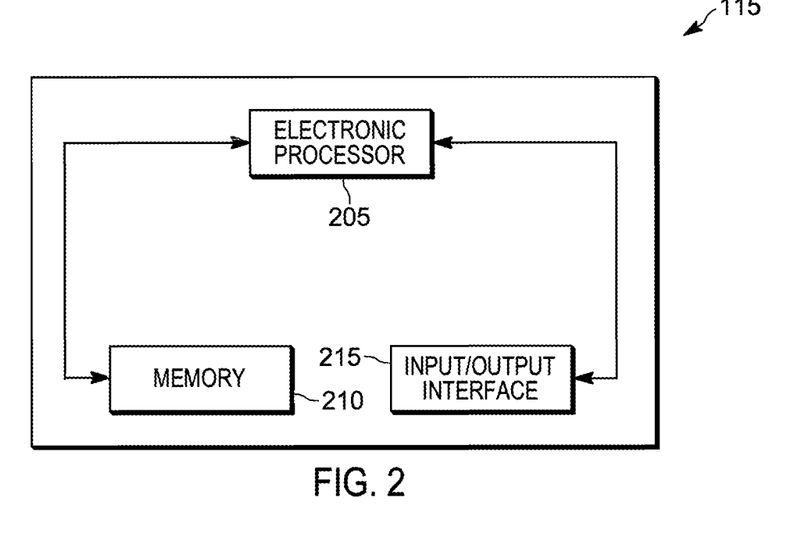
FIG. 2 is a block diagram of an electronic control unit of the system for performing a diagnostic on a hydraulic system of FIG. 1 according to one embodiment.

FIG. 2 is a block diagram of the electronic controller 115 of the diagnostic system 105 according to one embodiment. The electronic controller 115 includes a plurality of electrical and electronic components that provide power, operation control, and protection to the components and modules within the electronic controller 115. In the example illustrated, the electronic controller 115 includes, among other things, an electronic processor 205 (such as a programmable electronic microprocessor, microcontroller, or similar device), a memory 210 (for example, non-transitory, machine readable memory), and an input/output interface 215. The electronic processor 205 is communicatively connected to the memory 210 and the input/output interface 215. The electronic processor 205, in coordination with the memory 210 and the input/output interface 215, is configured to implement, among other things, the methods described herein.

Figure 3:
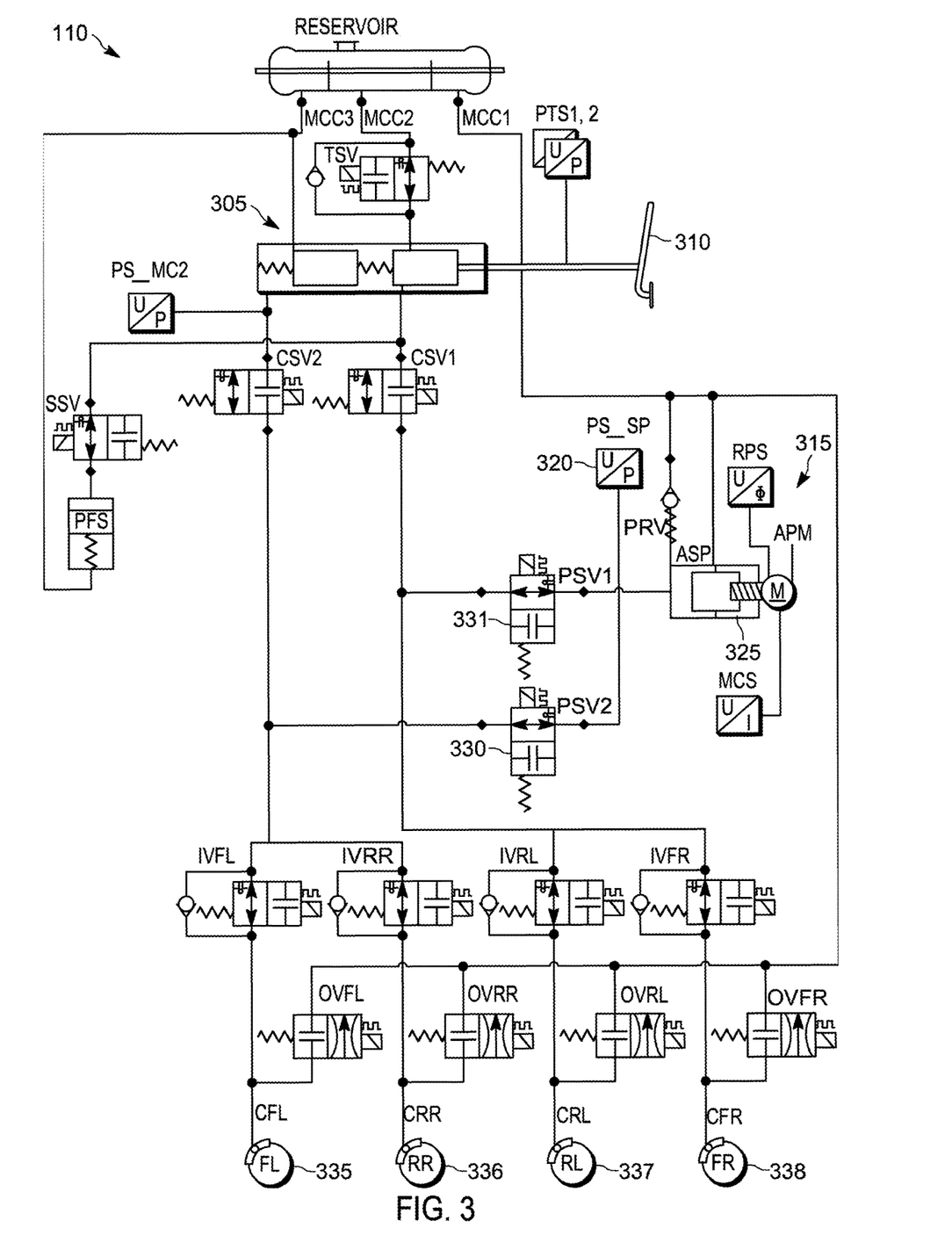
FIG. 3 is a diagram of a hydraulic system according to one embodiment with the system of performing a diagnostic on the hydraulic system of FIG. 1 shown in conjunction.

The electronic controller 115 may be implemented in several independent controllers (for example, programmable electronic control units) each configured to perform specific functions or sub-functions. Additionally, the electronic controller 115 may contain sub-modules that include additional electronic processors, memory, or application specific integrated circuits (ASICs) for handling input/output functions, processing of signals, and application of the methods listed below. In other embodiments, the electronic controller 115 includes additional, fewer, or different components FIG. 3 illustrates the hydraulic system 110 according to one embodiment. The hydraulic system, although illustrated as a braking system, may encompass various other types of hydraulic systems found in a vehicle as discussed above.

The hydraulic system 110 includes several components including a main cylinder 305, a brake pedal 310, a plunger system 315 (including a pressure sensor 320, a plunger 325, and one or more plunger system valves 330 and 331), and one or more outlets 335, 336, 337, and 338. The hydraulic system 110 may contain other components, fewer components, or more components according to other embodiments.

The main cylinder 305, according to one embodiment, acts as a primary means of pressurizing fluid in the hydraulic system 110. The main cylinder 305 applies pressure to the fluid in the hydraulic system 110 in response to an input on the main cylinder 305. For example, as exemplified in FIG. 3, for the main cylinder 305 in a braking system, a driver may press down on the brake pedal 310 which then adds pressure to the fluid in the braking system. The main cylinder 305 may be one large cylinder, several small cylinders, or some combination of the two working alone or in tandem in order to supply pressure to the fluid in the system. Furthermore, the main cylinder 305 may be a combination of a master cylinder and one or more slave cylinders that, in response to a lower pressure being applied to the main cylinder, apply a higher pressure to the fluid, in order to reduce the necessary pressure needed to be applied to the main cylinder 305. In other embodiments, the main cylinder 305 may apply pressure to fluid in a power steering system, a suspension system, and other forms of hydraulic systems.

In some embodiments, the hydraulic system 110 may be configured such that the input device, such as the brake pedal 310, is not fluidly connected to the hydraulic system 110. For example, the brake pedal 310 may be attached to a sensor that detects the depression of the brake pedal 310. The sensor may further be a position sensor, which measures how far an operator of the vehicle 100 depresses the brake pedal 310. For example, the operator of the vehicle 100 may depress the brake pedal 310 three millimeters. The position sensor detects that the brake pedal 310 has been depressed three millimeters and sends a signal to an electronic controller (in some embodiments, the electronic controller 115). The electronic controller then sends a signal to apply an amount of pressure equivalent to the depression of three millimeters to the hydraulic system 110 without needing the brake pedal 310 to provide mechanical force on the hydraulic fluid. In another embodiment, the brake pedal 310 is depressed ten millimeters. In depressing the brake pedal 310 further, the signal to the electronic processor indicates that the brake pedal 310 has been depressed a further distance and a larger equivalent pressure is supplied to the hydraulic system 110 in response.

This embodiment of the hydraulic system 110 may be considered a one-box solution hydraulic system 110. For example, the Integrated Power Brake (IPB) system created by Bosch Chassis Systems Brakes is a one-box solution hydraulic system 110.

The pressure sensor 320 may be implemented using multiple pressure sensors, sensor arrays, multiple sensing components, and multiple different types of sensors. The pressure sensor 320 may be communicatively connected via the hydraulic system 110 to the electronic controller 115 or directly coupled to the electronic controller 115. The pressure sensor 320 may be positioned at various places within the plunger system 315. The pressure sensor 320 may be configured to detect pressure relative to a perfect vacuum, relative to a current atmospheric pressure, a preset pressure level, a differential pressure, and others. Furthermore, the pressure sensor 320 may detect pressure using a strain gauge, a diaphragm and pressure cavity configured to create a variable capacitance based upon pressure, a diaphragm configured to create a change in induction based upon pressure, and others.

The plunger 325 may be implemented using a single plunger or multiple plungers. The plunger 325 may be communicatively connected via the hydraulic system 110 to the electronic controller 115 or directly coupled to the electronic controller 115. The plunger 325 is, in some embodiments, a cylinder that has a piston at one end, used to inject and pressurize fluid into the hydraulic system 110. The piston may be controlled by a motor or other actuation device configured to move the piston through the cylinder in the plunger 325.

The plunger system 315 one or more plunger system valves 330 and 331. The one or more plunger system valve 330 and 331 are open when the plunger system 315 is in use, and are otherwise closed in order to keep the plunger system 315 separate from the main cylinder 305 and other components of the hydraulic system 110 while in normal use. In one embodiment, when the plunger system 315 has the one or more plunger system valves 330 and 331 open, other valves connecting the main input (such as the main cylinder 305) of the hydraulic system 110 may close in order to keep the plunger system 315 disconnected from the main input. It is advantageous to keep the main input disconnected from the plunger system 315, as the plunger system 315 will apply a pressure on the hydraulic system, which may catch the driver of the vehicle 100 unaware and disorient him or her or produce unexpected behavior in the hydraulic system 110. However, in other embodiments, the main input may stay open in order to connect to the plunger system 315.

The hydraulic system 110 has one or more outlets 335, 336, 337, and 338, according to one embodiment. The at least one outlet 335, 336, 337, 338 may be, as exemplified in FIG. 3, brake pads. However, in other embodiments, the one or more outlets 335, 336, 337, and 338 may be a power steering column, a vehicle suspension, and others. The plunger system 315 is configured such that, when the one or more plunger system valves 330 and 331 are open, the plunger system 315 is coupled with the one or more outlets 335, 336, 337, and 338.

Figure 4A:
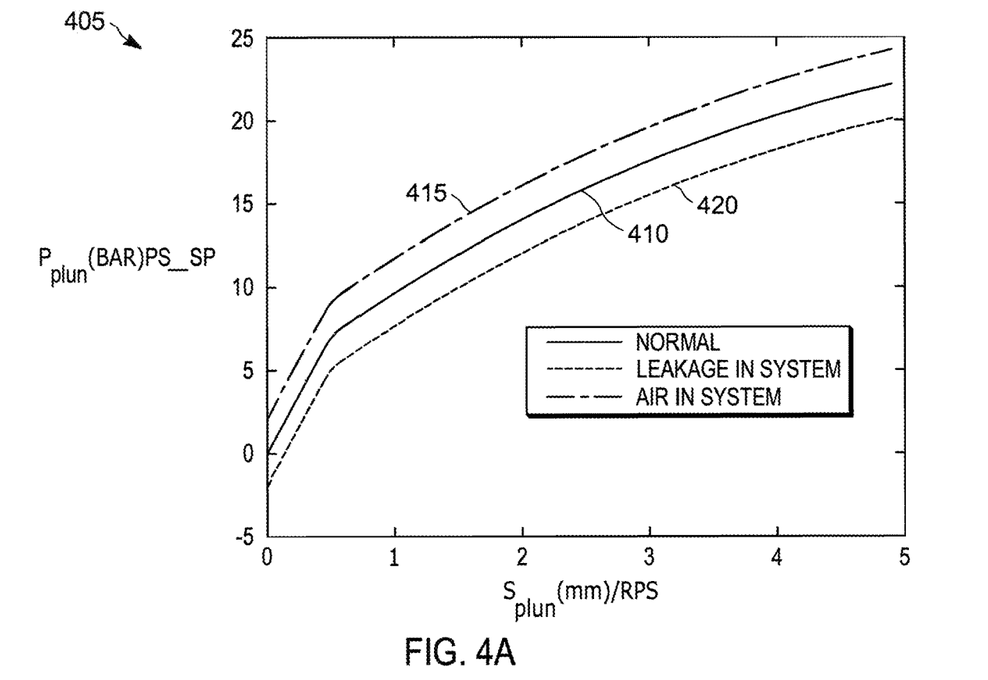
FIG. 4A is a graph that shows a position versus pressure graph according to one embodiment.

FIG. 4A illustrates a position versus pressure graph created by the diagnostic system 105 and hydraulic system 110 according to one embodiment. In another embodiment, the position versus pressure graph is stored in the memory 210 and is based upon experimental data. Graph 405 shows an exemplary graph of a set of position versus pressure curves. In a hydraulic system such as the hydraulic system 110 of FIG. 3, a position of the plunger 325 can be determined. Furthermore, a pressure of the hydraulic system 110 can be determined by the pressure sensor 320 at any given position of the plunger 325. When the hydraulic system 110 is in normal working order, the normal system curve 410 is generated by the diagnostic system 105 as a function of the position of the plunger 325 and the pressure measured by the pressure sensor 320. The normal system curve 410 is generally predictable when the plunger 325 is moving at a given constant rate. However, if there is residual, undesired air in the hydraulic system 110 or if there is a leakage in the hydraulic system 110 a different curve is generated by the diagnostic system 105. For example, if excess air exists in the hydraulic system 110, a higher pressure is measured by the pressure sensor 320 at a given position of the plunger 325 for the rate at which the plunger 325 is moving than is expected from the normal position curve 410, and an air-in-system curve 415 is generated by the diagnostic system 105 instead of the expected normal system curve 410.

Conversely, if the pressure of the hydraulic system 110 is measured by the pressure sensor 320 to be lower than expected at a given position of the plunger 325 for the rate at which the plunger 325 is moving, a leakage-in-system curve 420 is generated by the diagnostic system 105 instead of the expected normal system curve 410.

There may be some air in a normally functioning hydraulic system. For example, the hydraulic system 110 may contain air. The air in the hydraulic system 110 is accounted for (as described below) in order to generate the normal system curve 410.

Figure 4B:
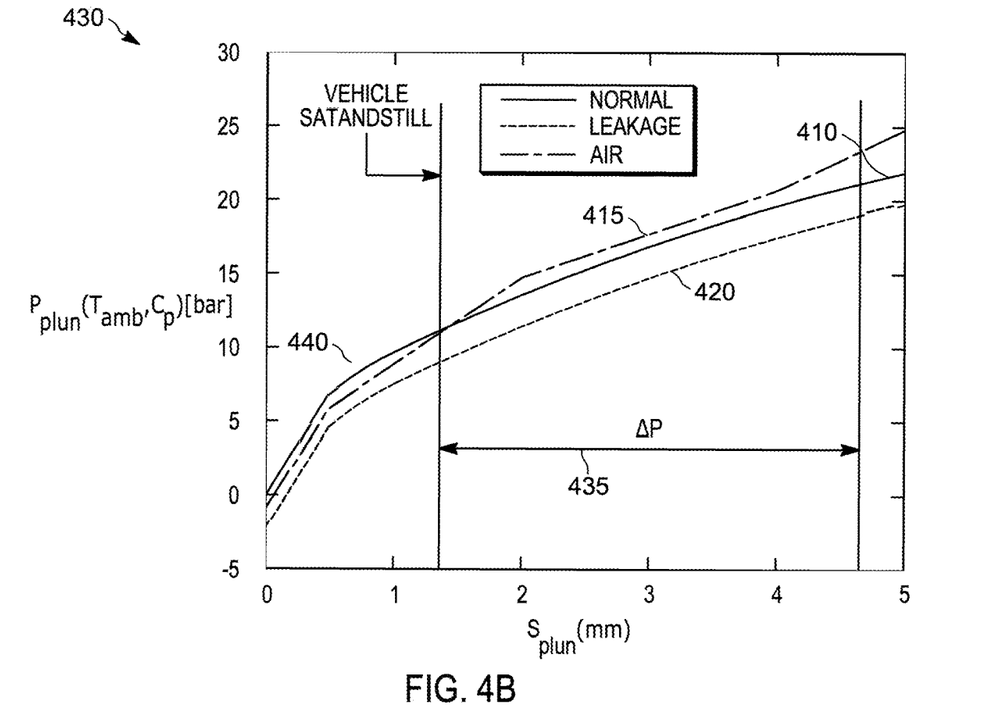
FIG. 4B is a graph that shows a position versus pressure graph with an adjusted pressure according to one embodiment.

FIG. 4B illustrates a position versus pressure graph 430 that shows a solution to this problem. An adjusted pressure 435 is added to the hydraulic system 110. In some instances, this adjusted pressure 435 is introduced by moving the plunger 325 a specified distance in order to compensate for the air that is normally in the hydraulic system 110 before taking a measurement of pressure in the hydraulic system 110. In other instances, the adjusted pressure 435 is a known value used as an offset to the pressure value output by the pressure sensor 320. In still other instances, the adjusted pressure 435 is an offset by the electronic controller 115 to modify the value the electronic controller 115 received from the pressure sensor 320. The adjusted pressure 435 allows the diagnostic system 105 to avoid indicating a curve such as the normal system curve 410 in graph 430 as a false positive 440 for having excess air in the system.

The normal system curve 410, the air-in-system-curve 415, and the leakage-in-system-curve 420 shown in graph 405 and graph 430 are exemplary of an embodiment of the invention and may have different numerical values associated with the respective curves than represented.

Figure 5:
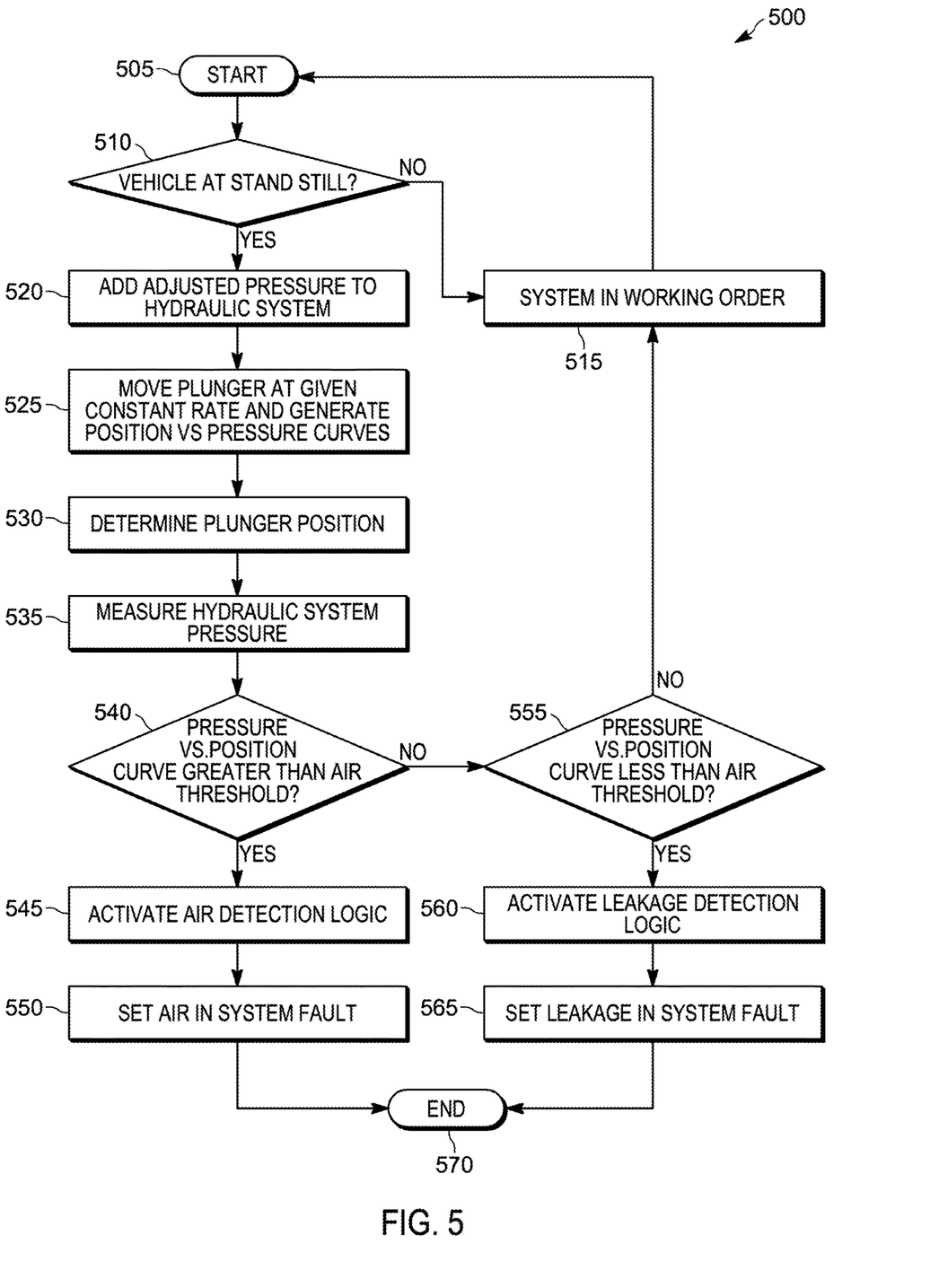
FIG. 5 is a flowchart of a method of operating the system for performing a diagnostic on a hydraulic system of FIG. 1 according to one embodiment.

FIG. 5 illustrates a method 500 for performing a diagnostic on the hydraulic system 110 using the diagnostic system 105 according to one embodiment. In the illustrated method, the electronic controller 115 begins in a start state (block 505). The electronic controller 115 then waits for the vehicle 100 to be at a standstill (block 510). If the vehicle 100 is determined to not be at a standstill, the hydraulic system 110 is assumed to be in working order (block 515). The vehicle 100 is determined to be at a standstill (block 510) using information from each wheel speed sensor 120, 121, 122, and 123 responding to a request by the electronic controller 115. For example, each wheel speed sensor 120, 121, 122, 123 may measure wheel speed for each wheel 130, 131, 132, and 133. The measured speed is sent back to the electronic controller 115 and, if each wheel 130, 131, 132, 133 is determined, by the electronic controller 115, to have wheel speed of 0 km/h, the electronic controller sends a signal to the hydraulic system 110 that the vehicle 100 is "at a standstill" or "not moving" or "safe to proceed with test".

In other embodiments, the vehicle 100 is determined to be at a standstill by a configuration of open and closed valves. Certain valves of the hydraulic system 110 may be open or closed depending on if the vehicle 100 is at a standstill. For example, valves connecting the hydraulic system 110 to the plunger system 315 may only be open when a brake is being applied. The electronic controller 115 is configured to detect which valves are opened and closed and determine if the vehicle 100 is at a standstill based upon which of the valves are open and closed.

It is advantageous that the vehicle 100 be at a standstill if the hydraulic system 110 is a braking system or other system that impacts operation of the vehicle 100, as the plunger 325 affects the hydraulic system 110 (as discussed below) and, therefore, may cause confusion or panic in the driver or operator by responding with unexpected behavior during operation of the vehicle 100.

If the vehicle 100 is determined to be at a standstill in block 510, the adjusted pressure 435 is added to the hydraulic system 110 at block 520. The electronic controller 115 sends a signal to move the plunger 325 at a constant rate at block 525. At block 525, a normal system curve such as the normal system curves 410 of FIG. 4 is also generated for the given rate of movement for the plunger 325 by the electronic controller 115. Furthermore, two thresholds are further defined by the electronic controller 115. The first is an air-in-system curve such as the air-in-system curves 415 of FIG. 4, which is defined by, when the position of the plunger 325 is at a first threshold, the pressure being equal to or greater than a second threshold. The second is a leakage-in-system curve such as the leakage-in-system curves 420 of FIG. 4, which is defined by, when the position of the plunger 325 is at a third threshold, the pressure being equal to or less than a fourth threshold.

After a certain amount of time, defined by the electronic controller 115, the position of the plunger 325 is determined at block 530. This can be done by using a sensor to measure the current location of the plunger 325 compared to the starting location, by calculating the distance the plunger 325 has moved at the given constant rate defined by the electronic controller 115, or by other methods. Once the position of the plunger 325 is determined, the pressure of the hydraulic system 110 is measured by the pressure sensor 320 at block 535 and received at the electronic controller 115 from the pressure sensor 320.

The determined position of the plunger 325 and the pressure received from the pressure sensor 320 are compared against the normal system curve 410, the air-in-system curve 415, and the leakage-in-system curve 420 generated by the electronic controller 115. At block 540, the determined position and received pressure are compared to the first threshold and the second threshold, respectively, by the electronic controller 115. If the determined position is at the first threshold and the received pressure is equal to or greater than the second threshold, it is determined by the electronic controller 115 that there is excess air in the hydraulic system 110. The electronic controller 115 begins air detection logic at block 545 and sets a system fault to, in this example, "AIR" at block 550. The electronic controller 115 uses this system fault to send an "AIR" diagnostic to the diagnostic indicator 125, which can indicate to the driver or other operator of the vehicle 100 that there is excess air in the hydraulic system 110 via an LED light, an alarm, or other indicators as discussed above.

If the electronic controller 115 determines that the received pressure is below the second threshold when the determined position is at the first threshold, the electronic controller 115 then compares the determined position to the third threshold and the received pressure to the fourth threshold at block 555. If the electronic controller 115 determines that the determined position is at the third threshold and the received pressure is below the fourth threshold, the electronic controller 115 determines that there is a leakage in the hydraulic system 110. The electronic controller 115 begins leakage detection logic at block 560 and sets a system fault to, in this example, "LEAKAGE" at block 565. The electronic controller 115 uses this system fault to send a "LEAKAGE" diagnostic to the diagnostic indicator 125, which can indicate to the driver or other operator of the vehicle 100 that there is a leakage in the hydraulic system 110 via an LED light, an alarm, or other indicators as discussed above.

It is to be understood that the first, second, third, and fourth thresholds may be set to a system-specific value, a generic value for all vehicles made by a manufacturer, or to any other value chosen. It is also to be understood that the first and third threshold, both used as threshold values for the determined position of the plunger 325, may be the same value or may be different values. In a similar way, it is to be understood that the second and fourth thresholds, both used as threshold values for the received pressure, may be the same value or may be different values.

If either an "AIR" system fault is set at block 550 or "LEAKAGE" system fault is set at block 565, the electronic controller 115 moves into an end state at block 570. In the end state, the electronic controller 115 may send an indication to the driver that a system fault has occurred, the electronic controller 115 may move back to the start state at block 505, or the electronic controller 115 may perform another action associated with the diagnostic system 105. Otherwise, if neither an "AIR" system fault (at block 550) or a "LEAKAGE" system fault (at block 565) are set, the electronic controller 115 determines that the system is in working order (at block 515) and returns to the start state 505 of the diagnostic system 105, and prepares for the vehicle to be at a standstill again (at block 510) in order to perform the method 500 again.

As a consequence, the diagnostic system 105 performs a diagnostic on the hydraulic system 110 by determining when the vehicle 100 is at a standstill, moving a plunger 325 at a constant given rate, determining a position of the plunger 325, measuring a pressure of the hydraulic system 110 with the pressure sensor 320, and compares the determined position and measure pressure to a normal system curve 410 to determine if there is excess air in the hydraulic system 110 or a leakage in the hydraulic system 110, and sends a diagnostic to the diagnostic indicator 125 informing the driver or operator of the vehicle 100 that there is an issue with the hydraulic system 110.

Various features, advantages, and embodiments are set forth in the following claims.

What is claimed is:

1. A system for performing a diagnostic on a hydraulic system in a vehicle when the vehicle is at a standstill, the system comprising:
    a plunger coupled to the hydraulic system of the vehicle;
    a pressure sensor; and
    an electronic controller, configured to
        generate a signal to move the plunger a specified distance to compensate for air normally in the hydraulic system,
        generate a signal to further move the plunger,
        receive, from the pressure sensor, a pressure of the hydraulic system,
        determine a position of the plunger,
        compare the position of the plunger and the pressure to a position versus pressure curve, and
        send at least one diagnostic indication to at least one diagnostic indicator.

2. The system of claim 1, wherein the at least one diagnostic indication is sent to the at least one diagnostic indicator when the position of the plunger is at a first threshold and the pressure is above a second threshold.

3. The system of claim 1, wherein the at least one diagnostic indication is sent to the at least one diagnostic indicator when the position of the plunger is at a third threshold and the pressure is below a fourth threshold.

4. The system of claim 1, wherein the electronic controller is configured to move the plunger at a constant rate.

5. The system of claim 1, wherein the position versus pressure curve is determined by the electronic controller.

6. The system of claim 1, wherein the hydraulic system is configured to have an input electronically coupled to the hydraulic system.

7. The system of claim 1, wherein the diagnostic indication is an excess air indication.

8. The system of claim 1, wherein the diagnostic indication is an air leakage indication.

9. A method for performing a diagnostic on a hydraulic system in a vehicle when the vehicle is at a standstill, the method comprising:
   generating, with an electronic controller, a signal to move a plunger fluidly connected to the hydraulic system a specified distance to compensate for air normally in the hydraulic system,
   generating, with the electronic controller, a signal to further move the plunger,
   receiving, from a pressure sensor, a pressure of the hydraulic system,
   determining a position of the plunger,
   comparing, in the electronic controller, the position of the plunger and the pressure to a position versus pressure curve, and
   sending, from the electronic controller, at least one diagnostic indication to at least one diagnostic indicator.

10. The method of claim 9, wherein the at least one diagnostic indication is sent to the at least one diagnostic indicator when the position of the plunger is at a first threshold and the pressure is above a second threshold.

11. The method of claim 9, wherein the at least one diagnostic indication is sent to the at least one diagnostic indicator when the position of the plunger is at a third threshold and the pressure is below a fourth threshold.

12. The method of claim 9, wherein the electronic controller is further configured to move the plunger at a constant rate.

13. The method of claim 9, wherein the position versus pressure curve is determined by the electronic controller.

14. The method of claim 9, wherein the hydraulic system is configured to have an input electronically coupled to the hydraulic system.

15. The method of claim 9, wherein the diagnostic indication is an excess air indication.

16. The method of claim 9, wherein the diagnostic indication is an air leakage indication.

* * * * *